United States Patent [19]
Bodin et al.

[11] Patent Number: 5,687,884
[45] Date of Patent: Nov. 18, 1997

[54] METERING DEVICE FOR DISPENSING CONSTANT UNIT DOSES

[75] Inventors: Jacques Bodin, Levallois-Perret; Jean-Philippe Taberlet, Boege, both of France

[73] Assignee: Labcatal (societe anonyme), Montrouge, France

[21] Appl. No.: 537,945

[22] PCT Filed: Mar. 17, 1995

[86] PCT No.: PCT/FR95/00325

§ 371 Date: Nov. 21, 1995

§ 102(e) Date: Nov. 21, 1995

[87] PCT Pub. No.: WO95/25945

PCT Pub. Date: Sep. 28, 1995

[30] Foreign Application Priority Data

Mar. 21, 1994 [FR] France .................................. 94/03278

[51] Int. Cl.⁶ .................................................. G01F 11/06
[52] U.S. Cl. ........................ 222/321.7; 222/341; 222/494
[58] Field of Search .......................... 222/321.7, 321.8, 222/321.9, 341, 492, 494, 496

[56] References Cited

U.S. PATENT DOCUMENTS

| | | | |
|---|---|---|---|
| 4,685,594 | 8/1987 | Czech | 222/321.7 X |
| 5,033,647 | 7/1991 | Smith et al. | 222/494 X |
| 5,154,325 | 10/1992 | Ryder et al. | 222/494 X |
| 5,267,673 | 12/1993 | Crosnier et al. | 222/494 X |
| 5,447,258 | 9/1995 | Suzuki | 222/494 |

FOREIGN PATENT DOCUMENTS

| | | |
|---|---|---|
| 0 505 299 | 9/1992 | European Pat. Off. . |
| 1 341 579 | 9/1963 | France . |
| 2 635 473 | 2/1990 | France . |
| 2 676 714-A1 | 11/1992 | France . |
| WO 90/05091 | 5/1990 | WIPO . |

*Primary Examiner*—Joseph Kaufman
*Attorney, Agent, or Firm*—Oblon, Spivak, McClelland, Maier & Neustadt, P.C.

[57] ABSTRACT

The metering device includes a hollow plunger (5) delimiting a defined volume, mounted so that it can move on a receptacle (1), and communicating with it, as well as an elastic member connecting the plunger to the receptacle, consisting of an elastically deformable cylindrical collar (8) including at least one valve (14) capable of closing off the outlet orifice of the receptacle, and fitted around a closed cylinder (6), having the same axis as the cylindrical collar, integral with the receptacle (1). Application to the administration of pharmaceutical products in fluid form.

8 Claims, 4 Drawing Sheets

METERING DEVICE FOR DISPENSING CONSTANT UNIT DOSES

BACKGROUND OF THE INVENTION

1. Field of the Invention

The present invention relates to a metering device and more particularly to a device making it possible to meter out and deliver a predetermined quantity of a fluid without the intervention of a propellant gas. The new metering device can be used in all positions, and can be fitted to containers of various shapes.

In many fields, it is often necessary to be able to deliver precise metered amounts of fluids or liquids contained in a receptacle designed for this purpose, and in the pharmaceutical field in particular it is indispensable for the metered amounts delivered by the device to be both precise and constant, that is to say that the device has to deliver a predetermined metered amount, and this metered amount must remain identical, even after a relatively large number of uses.

Furthermore, in order to improve reliability of the metering device, and to make it easier to manufacture, it is desirable for it to include the smallest possible number of constituent parts.

2. Discussion of the Background

The metering devices currently in use in the state of the art often include a large number of parts, such as checkvalves, springs, plungers, stoppers, and etc. In addition, the metering devices have to exhibit good sealing to prevent air or water from entering the inside of the receptacle and damaging the product or composition which it contains, and as a general rule this sealing may be obtained satisfactorily only by adding additional elements such as rings, collars, filters or seals.

Thus, for example, Patent EP-A-0,395,754 describes a metering device designed for products of relatively high viscosity, such as cosmetic creams. This metering device consists of a stopper screwed onto the threaded outlet of a cylindrical receptacle comprising a variable-volume expansion chamber communicating with the inside of the receptacle via a valve and a pipe.

Patent FR-A-2,676,714 relates to a receptacle containing a fluid product to be dispensed, equipped with a device intended to protect the product contained in the receptacle after use, and providing a sealed closure without it being necessary to close off the outlet duct for the product using a cap. In one embodiment, the receptacle is a pressurized container equipped with a valve. Actuation of the valve causes fluid to flow which pushes back an elastic membrane including a needle valve surrounded by openings via which the product may flow out. When the valve is released, suction returns the membrane against its support such that the needle valve closes off the outlet orifice.

Such device affords good ease of use, but cannot reliably and repetitively dispense a predetermined metered amount of product.

Patent US-A-4,376,495 describes a device designed to provide an adjustable metered amount of a fluid contained in a flexible receptacle, comprising a hollow piston moving in the neck of the receptacle, combined with a valve allowing the fluid to pass.

Patent FR-A-2,674,024 describes a simple metering device comprising a relatively small number of constituent parts. The main element of this metering device essentially consists of a stopper containing an elastic deformable part pierced at its center with an orifice which is partially closed by a check valve, and including on its edge a tubular portion fitted to a lid made of a rigid material. This device is suitable for fluids which can be used especially in cosmetics, but is not appropriate for pharmaceutical products owing to the lack of precision in the metered amount delivered, and to the lack of sealing of the device as a whole.

The situation is that, in the field of pharmaceutical products, the conditions of precision and constancy of the metered amount delivered are essential and absolutely must be complied with, with a very small margin of error, without detracting from the ease of use. In addition, the sealing of the metering receptacle must be perfect, to preclude any risk of the primed state being lost, and also to ensure that the product to be dispensed, inside the receptacle, keeps well.

Thus, it is desirable to be able to have use of a metering device capable of permanently providing excellent sealing against air and against water, withstanding sterilization using heat or using radiation, including a small number of non-metallic constituent parts, and which can provide predetermined unitary metered amounts with good precision (of the order of ±5%) and with great simplicity of use.

SUMMARY OF THE INVENTION

The subject of the present invention is precisely a metering device which complies with the conditions indicated hereinabove, and which avoids the drawbacks of the devices already known in the art, and quite particularly a metering device which makes it possible to dispense constant unitary metered amounts, suitable for the administration of pharmaceutical products in the form of fluids. In addition, the metering device of the invention can be used in all positions, without the need to use a propellant gas.

The metering device according to the present invention is of the type including a receptacle containing the fluid to be dispensed, and a hollow plunger delimiting a defined volume, mounted so that it can move on the receptacle, and communicating with it, as well as an elastic member connecting the plunger to the receptacle, and its distinguishing feature is that the elastic member consists of an elastically deformable cylindrical collar, including at least one valve capable of closing off the outlet orifice of the receptacle, and is fitted around a closed cylinder, having the same axis as the cylindrical collar, integral with the receptacle.

Also, the volume defined by the inside of the hollow plunger and the deformable cylindrical collar may communicate with the outside via an outlet orifice which can be closed off by a valve.

According to one embodiment of the invention, the two aforementioned valves are mounted in opposition, that is to say that the valve mounted on the elastically deformable cylindrical collar is in the closed position when the plunger is acted upon against the reaction force of the cylindrical collar, whereas it is in the open position when the plunger is released and returns to its initial position under the action of the elastically deformable collar. Contrastingly, the valve for closing off the outlet orifice of the internal volume of the plunger is in the open position when the plunger is acted upon and in the closed position when the plunger is released.

According to a preferred embodiment, the valve mounted on the deformable cylindrical collar consists of a flexible lip integral with the collar, the collar/lip assembly being one piece. The base of the lip is situated on the receptacle side, while the edge of the lip is oriented toward the plunger. In a preferred embodiment, the lip has an annular shape. In the closed position, the lip is pressed against the closed cylinder integral with the receptacle.

Likewise, the valve for closing off the outlet orifice of the internal volume of the plunger consists of a flexible lip pressed against a cylinder located along the axis of the outlet orifice, the edge of the lip being oriented toward the outside.

Thus, simply pressing on the plunger causes blocking of the flexible lip integral with the deformable collar and drives the fluid which is in the internal volume of the plunger through the outlet orifice, lifting the lip of the closing-off member. When the plunger is released, the reverse movement causes closure of the lip of the closing-off member and opening of the lip integral with the deformable collar. Thus, the fluid present in the receptacle may penetrate the internal volume of the plunger, and it remains there until the plunger is actuated again.

For preference, the outside diameter of the deformable cylindrical collar, which corresponds to the inside diameter of the outlet orifice of the receptacle, is equal to approximately twice the diameter of the closed cylinder of the same axis about which the deformable cylindrical collar is placed. Also, the thickness of the cylindrical collar represents at least 75% of the gap separating the closed cylinder from the internal wall of the plunger, it being possible for this gap to be closed off by the flexible annular lip integral with the collar.

According to one embodiment of the invention, the receptacle comprises a cylindrical neck on which the hollow plunger may slide. Preferably, the cylindrical neck is double-walled and the body of the hollow plunger may slide between the two walls; this arrangement gives better guidance to the plunger.

The sliding of the plunger is limited by suitable means, making it possible to define a constant volume.

The cylindrical neck may form an integral part of the receptacle but, according to an alternative in accordance with the invention, it is also possible to use a receptacle equipped with an opening on which the cylindrical neck may be mounted, by screwing onto a screw thread provided in the opening of the receptacle, or by interlocking.

Likewise, the shape of the receptacle may be designed to suit the envisaged use. In particular, it may be advantageous to provide a piston in the bottom of the receptacle to maintain a suitable pressure making it easier to eject the fluid which it contains.

Thus, in the case of a metering device for pharmaceutical products in the form of an aerosol inside a pressurized receptacle, the volume of which generally lies between 10 ml and 150 ml, for example, the volume of the metered amount expelled upon each depression is equal to the internal volume of the plunger, which may lie between 50 μl and 5 μl approximately.

The metering device according to the invention makes it possible to dispense a number of metered amounts which generally lies between 20 and 100 metered amounts, depending on the volume of the receptacle, with a precision on the metered amount of the order of ±5% by volume, without the primed state being lost.

BRIEF DESCRIPTION OF THE INVENTION

The features and advantages of the present invention will appear in more detail in the following description, relating to preferred embodiments, with reference to the appended drawings, which represent:

DESCRIPTION OF THE PREFERRED EMBODIMENTS

Figure 1:
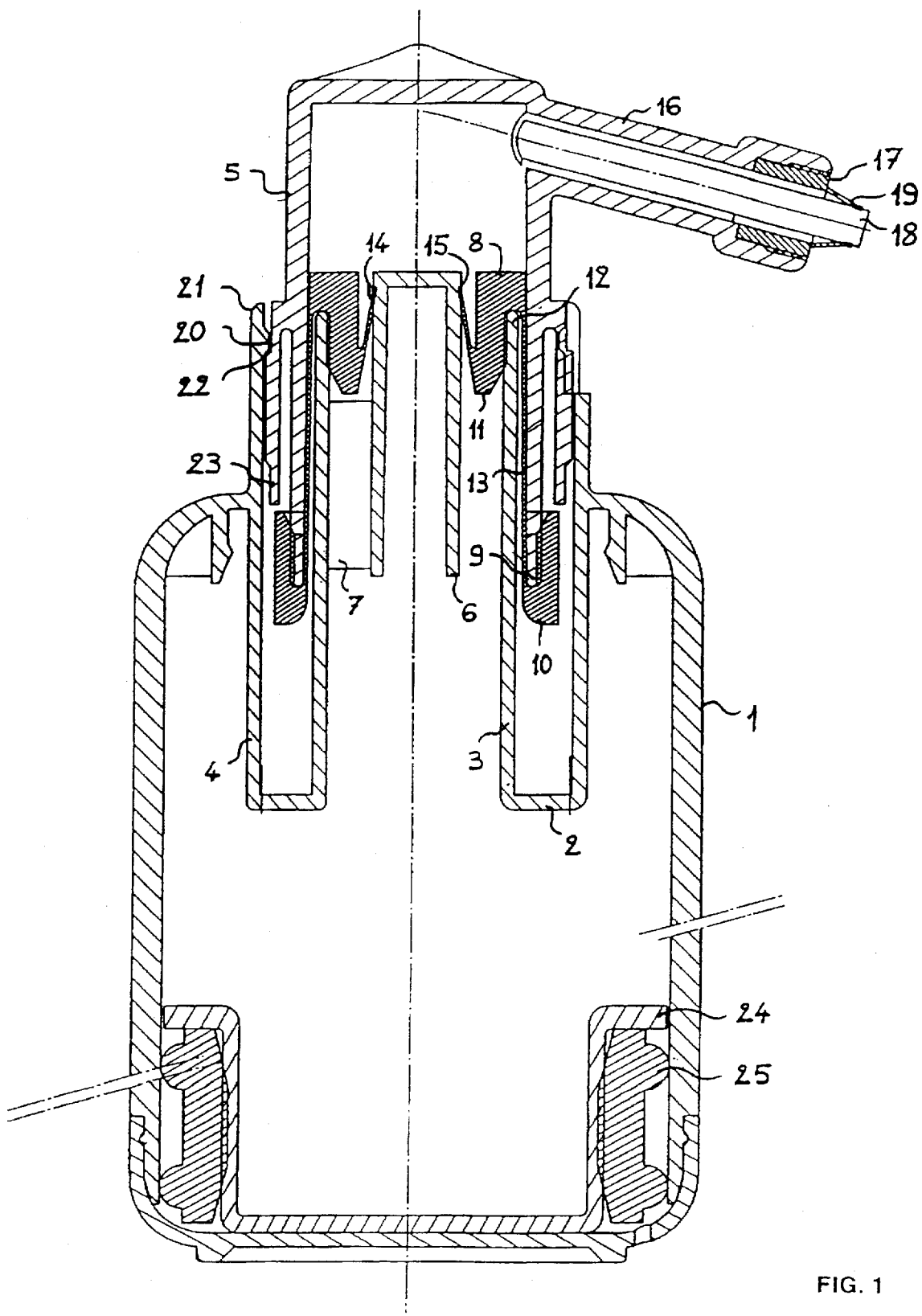
FIG. 1 represents a view in longitudinal section through a receptacle equipped with a metering device in accordance with the invention, the plunger being in the up position.

As FIG. 1 shows, the device of the invention as a whole is composed of a receptacle (1) including in its upper portion a cylindrical element (2) with double walls (3, 4) between which a plunger (5) of suitable cylindrical shape may slide. The receptacle (1) and the plunger (5) are preferably made from one and the same material, for example polypropylene.

The cylinder (2) is open at both its ends. Inside this cylinder (2) is placed a second cylinder (6) which is closed at its upper part, so that the two cylinders (2) and (6) are coaxial. The internal cylinder (6) is fixed to the main cylinder (2) by fastening tabs (7) arranged in the annular space separating the two cylinders. Just one fastening tab is represented in FIG. 1, but the device preferably has three or four of these.

Thus, the internal volume of the receptacle (1) communicates with the inside of the plunger (5) via the annular space separating the two cylinders (2) and (6). This space is, however, closed off by a collar (8) made of an elastically deformable material, for example made of a natural or synthetic rubber, a butadiene-styrene copolymer, silicone, or alternatively nitrile rubber.

The deformable collar (8) has a substantially cylindrical shape and provides a connection between the body of the receptacle (1) and the plunger (5). It is retained on the lower edge (9) of the plunger (5) by a bead (10), while a second bead (11) fixes it onto the edge (12) of the internal wall (3) of the cylindrical element (2).

Thus, the cylindrical intermediate portion (13) of the deformable collar (8) provides perfect sealing between the plunger (5) and the cylindrical element (2). On the other hand, the other bead (11) has a thickness slightly less than the space between the internal wall of the plunger and the internal cylinder (6), thus leaving a space through which the fluid contained in the receptacle (1) may pass.

The deformable collar (8) includes a flexible lip (14) situated on the internal face of the upper bead (11), which makes it possible to close off the space separating the upper bead (11) from the internal cylinder (6). The end of the lip (14) interacts with the groove (15) made in the face of the internal cylinder (6). The lip (14) is flexible enough that it can move away from the face of the internal cylinder (6) under the action of a pressure in the receptacle 1 or of suction inside the plunger (5).

The internal volume of the plunger (5) communicates with the outside via the pipe (16) equipped with a closing-off member (17) interacting with a cylindrical rod (18) placed along the axis of the pipe (16). This closing-off member (17) includes a lip (19) capable of lifting and moving away from the rod (18) under the action of the fluid leaving the receptacle via the pipe (16). As soon as the pressure of the fluid is relieved, the lip (19) returns to close off the outlet of the pipe (16), pressing elastically against the rod (18), thus providing sealed closure of the pipe and preventing air from penetrating the inside of the plunger (5).

A rib (20) formed on the internal face of the external wall (21) of the main cylinder (2) facing the external wall of the plunger (5) interacts with a shoulder (22) provided on an annular tag (23) integral with the plunger, so as to limit the travel of the plunger and prevent it from popping out at the end of the upward movement in the main cylinder. The tag (23) has enough flexibility to allow the plunger (5) to be fitted forcibly into the space between the two walls of the main cylinder (2).

The receptacle has yet another piston (24) which can rise up along the internal wall, as well as a sealing ring (25) which may be made of an elastic material, such as nitrile rubber, a silicone or a thermoplastic elastomer, for example.

The operation of the metering device in accordance with the present invention is indicated below.

In the initial position, before first use, the device is in the position represented in FIG. 1.

When the user exerts a pressure by pushing down on the lid portion of the plunger (5), the latter descends, sliding between the two walls of the cylinder (2). This movement gives rise to a stretching of the intermediate portion (13) of the deformable collar (8). The air inside the plunger (5) is driven out via the pipe (16) through the closing-off member (17) and lifting the lip (19). The pressure of the air in the plunger (5) holds the annular lip (14) in a blocked position against the wall of the internal cylinder (6) as in the position represented in FIG. 1, thus preventing any communication between the inside of the receptacle (1) and the internal volume of the plunger (5).

Figure 2:
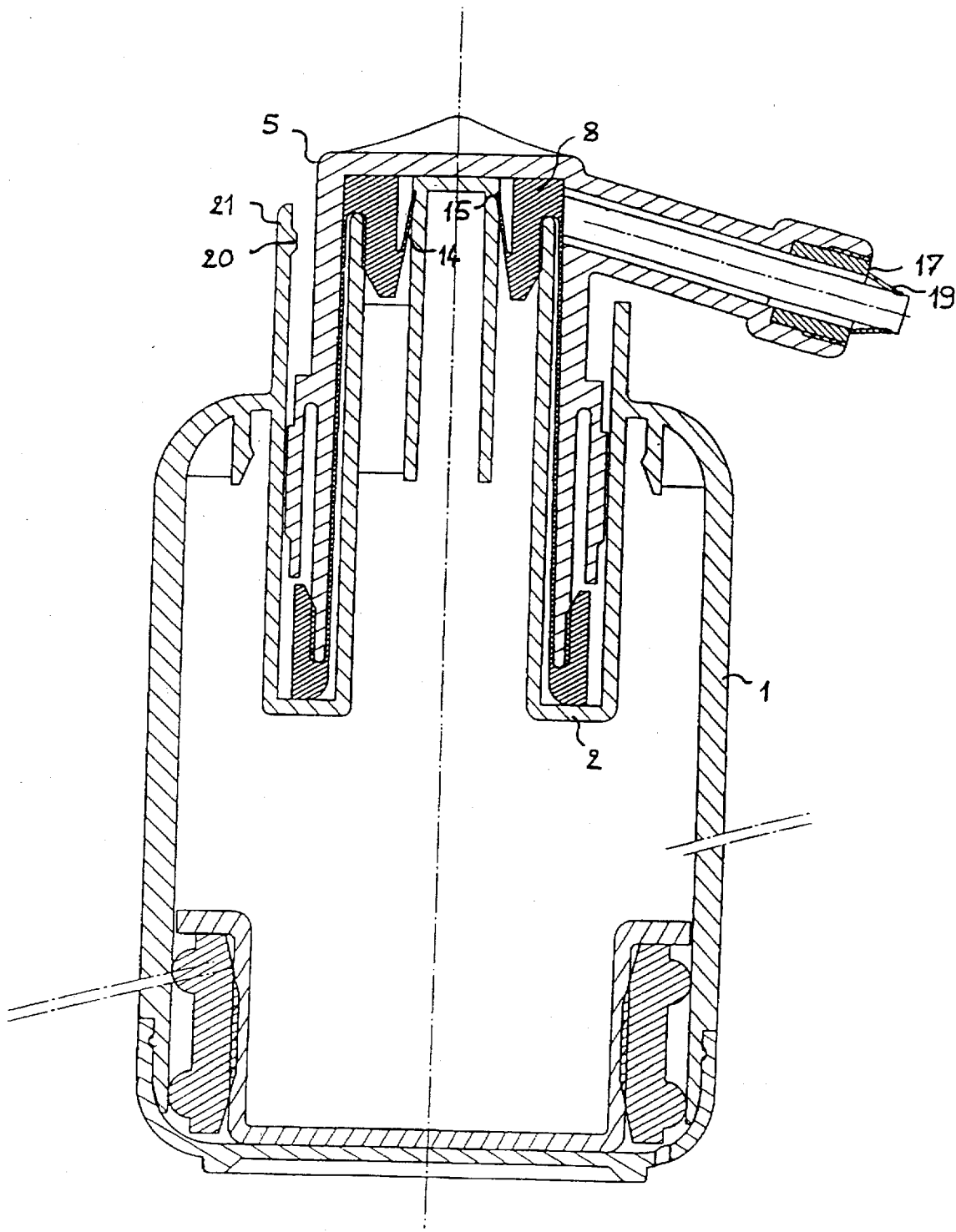
FIG. 2 represents the receptacle of FIG. 1, the plunger of the metering device being in the depressed position.

At the end of its travel, the plunger (5) occupies the position represented in FIG. 2, the internal wall of the lid of the plunger then being against the upper portion of the deformable collar (8).

As soon as the pressure on the lid of the plunger (5) is released, this plunger rises up, sliding between the two walls of the main cylinder (2) under the elastic spring action of the deformable collar (8), which tends to return to its initial position. In this movement, a slight suction is created in the internal volume of the plunger (5), the outlet of which is closed by the closing-off member (17). The fluid in the receptacle (1), which is at a higher pressure, then pushes back the annular lip (14) and progressively enters the internal volume of the plunger (5).

At the end of the upward travel of the plunger (5), the latter comes into abutment against the rear (21) and the plunger therefore resumes its initial position exactly. Since the difference in pressure between the inside of the receptacle (1) and the internal volume of the plunger (5) has decreased, the annular lip (14) comes back to bear against the wall of the internal cylinder (6), in the groove (15). The volume delimited by the plunger (5) therefore contains a given metered amount of the fluid from the receptacle (1), and this metered amount is always the same each time the plunger (5) moves between its two extreme positions represented in FIGS. 1 and 2 respectively.

This metered amount of fluid is isolated from the outside by the closing-off member (17) and from the inside of the receptacle by the annular lip (14) of the deformable collar (8). It is thus ready to be administered.

Pressing again on the plunger (5) causes the metered amount of fluid to be outlet via the pipe (16) and through the closing-off member (17), pushing back the lip (19). When the plunger is in the depressed position, as represented in FIG. 2, the entire metered amount has been ejected, except for a small volume which remains in the pipe (16), but this volume is identical upon each use and the metered amount administered is therefore unchanged from one use to the next.

When the pressure on the plunger (5) is released, the latter rises up, sliding between the two walls of the main cylinder (2) as indicated hereinabove, and a new metered amount of fluid enters the internal volume of the plunger. Upon each use, the metered amount of fluid is identical, its volume being equal to the internal volume of the plunger in the raised position, limited by the limit stop (21).

Figure 3:
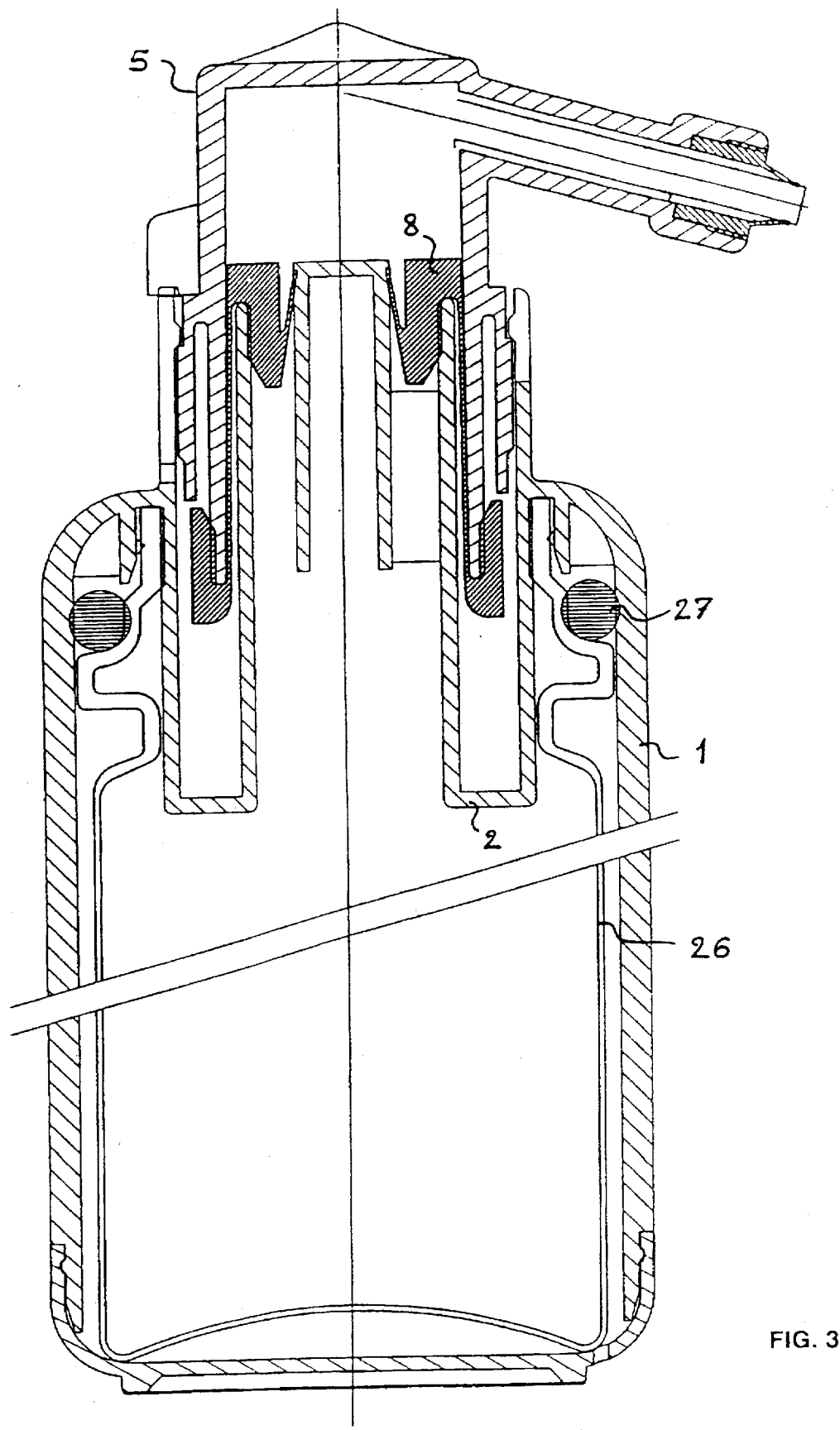
FIG. 3 represents a longitudinal section through an alternative embodiment of a metering device in accordance with the invention.

The alternative embodiment represented in FIG. 3 has the same deformable collar (8) and the same plunger (5). The fluid to be dispensed in unitary metered amounts in this case is retained in the flexible container (26) fitted inside the receptacle, and sealing is provided by an additional ring (27) made of nitrile rubber or of silicone, placed in the upper part of the receptacle (1), between the wall and the main cylinder (2). This simplified form avoids the use of a piston (24). The flexible container (26), or pouch, is made of a thermoplastic material, and preferably made of polyethylene or polypropylene.

Figure 4:
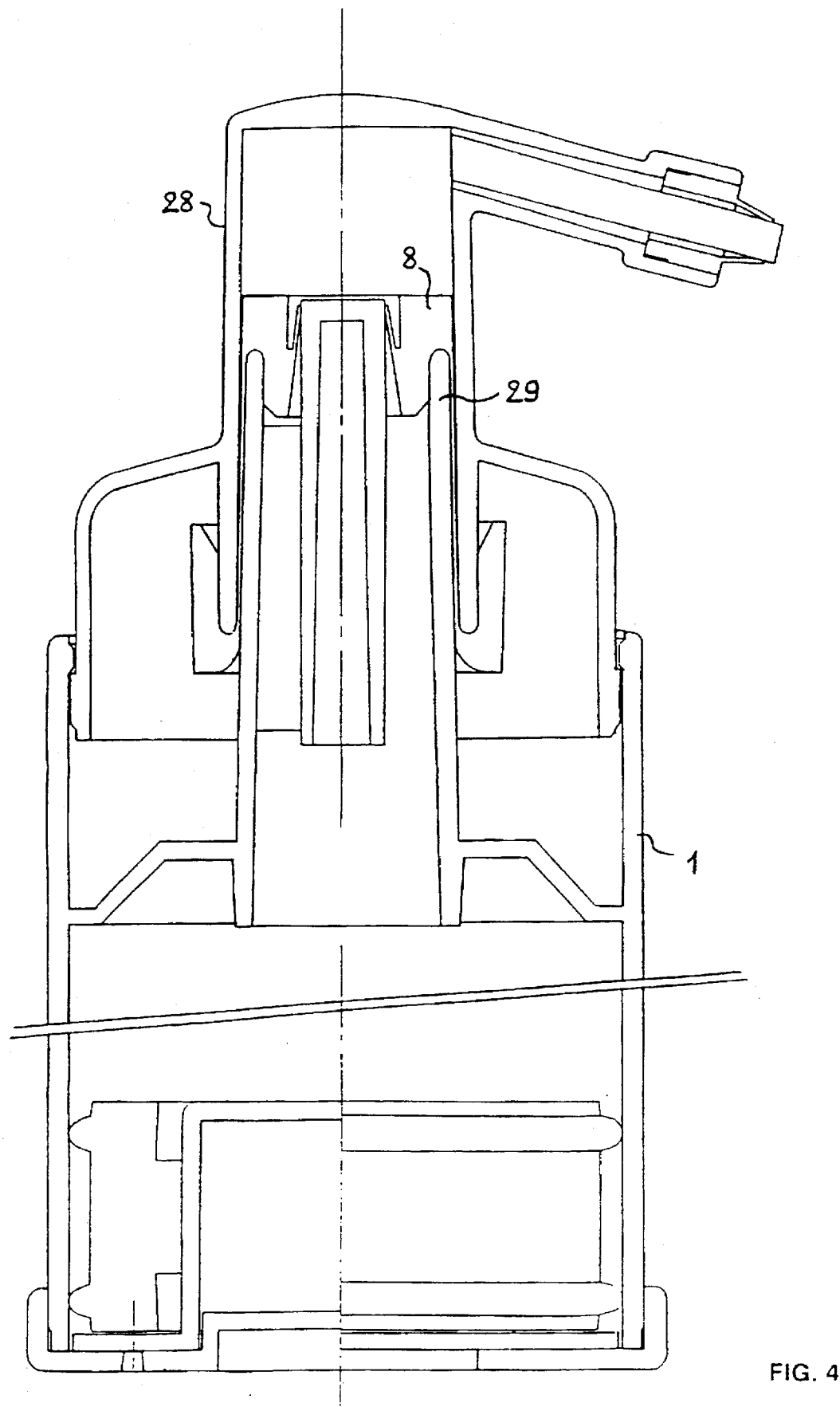
FIG. 4 represents a simplified alternative to the metering device of the invention, in longitudinal section.

The metering device represented in FIG. 4 is a simplified alternative to that of FIG. 1 with which it has in common the main elements, that is to say the receptacle (1) and the deformable annular collar (8). The plunger (28) in this case slides between the walls of the receptacle (1) and the main cylinder (29) which is single-walled.

The invention has been described hereinabove for the example of a metering device which can be used for pharmaceutical products, but it is clearly applicable to all fields in which it is necessary to dispense precise and constant metered amounts of fluid.

What is claimed as new and desired to be secured by Letters Patent of the United States is:

1. A metering device for dispensing constant unit doses of a fluid contained in a receptacle having an outlet orifice defined around an internal cylinder, the metering device comprising:

a hollow plunger mounted on a receptacle so as to delimit a defined volume communicating with the outlet orifice of the receptacle, the hollow plunger being movably mounted so as to vary the size of the volume;

an elastic member having an elastically deformable cylindrical collar and having an annular valve capable of closing off the annular outlet orifice of the receptacle, the elastic member connects the hollow plunger to the receptacle, the annular valve of the elastic member is fitted around the internal cylinder, the internal cylinder having the same axis as the elastically deformable cylindrical collar; and the hollow plunger has an outlet orifice and a valve, the volume delimited by the internal wall of the moveable hollow plunger and the elastically deformable cylindrical collar is capable of communicating with the outside through the hollow plunger outlet orifice which is capable of being closed off by the hollow plunger valve.

2. A metering device as recited in claim 1, wherein the annular valve of the elastic member has a flexible lip, the flexible lip is pressed against the internal cylinder of the receptacle.

3. A metering device as recited in claim 2, wherein the internal cylinder of the receptacle has a groove interacting with the end of the flexible lip of the annular valve of the elastic member.

4. A metering device as recited in claim 1, wherein the receptacle has a cylindrical neck, and the hollow plunger is slidable on the cylindrical neck of the receptacle.

5. A metering device as recited in claim 4, wherein the cylindrical neck is double walled, the body of the hollow plunger is slidable between the double walls of the cylindrical neck.

6. A metering device as recited in any one of claims 1, 4, or 5, wherein the outside diameter of the elastically deformable cylindrical collar is substantially equal to twice the diameter of the internal cylinder of the receptacle.

7. A metering device as recited in any one of claims 1, 4, or 5, wherein the elastically deformable cylindrical collar has a thickness at least as thick as seventy-five percent of the gap separating the internal cylinder from the internal wall of the plunger.

8. A metering device as recited in claim 6, wherein the elastically deformable cylindrical collar has a thickness at least as thick as seventy-five percent of the gap separating the internal cylinder from the internal wall of the plunger.

* * * * *